United States Patent
Mons et al.

(10) Patent No.: US 7,836,572 B2
(45) Date of Patent: Nov. 23, 2010

(54) METHOD OF MAKING A WIPER FOR A SEALING LABYRINTH, AND A THERMOMECHANICAL PART AND A TURBOMACHINE INCLUDING SUCH A WIPER

(75) Inventors: Claude Marcel Mons, Savigny le Temple (FR); Joël Olivier Alfred Abel Vigneau, Champcueil (FR)

(73) Assignee: SNECMA, Paris (FR)

( * ) Notice: Subject to any disclaimer, the term of this patent is extended or adjusted under 35 U.S.C. 154(b) by 1015 days.

(21) Appl. No.: 11/560,034

(22) Filed: Nov. 15, 2006

(65) Prior Publication Data
US 2007/0253810 A1   Nov. 1, 2007

(30) Foreign Application Priority Data
Nov. 15, 2005   (FR) .................................. 05 11580

(51) Int. Cl.
*B23P 25/00* (2006.01)
(52) U.S. Cl. ..................... 29/458; 415/173.5; 415/230
(58) Field of Classification Search .............. 415/173.5, 415/230; 29/458, 527.1, 527.2; 219/121.63, 219/121.64, 121.65, 121.66; 228/248.1; 427/554, 555, 556, 596, 597
See application file for complete search history.

(56) References Cited

U.S. PATENT DOCUMENTS

| | | | | |
|---|---|---|---|---|
| 4,323,756 A | * | 4/1982 | Brown et al. ........... | 219/121.66 |
| 4,657,171 A | | 4/1987 | Robins | |
| 4,730,093 A | * | 3/1988 | Mehta et al. ........... | 219/121.63 |
| 4,743,733 A | * | 5/1988 | Mehta et al. ........... | 219/121.66 |
| 4,884,820 A | * | 12/1989 | Jackson et al. ................. | 277/53 |
| 5,038,014 A | * | 8/1991 | Pratt et al. ............. | 219/121.64 |
| 5,149,936 A | * | 9/1992 | Walton, II .............. | 219/121.65 |
| 5,314,003 A | * | 5/1994 | Mackay ..................... | 164/494 |
| 5,554,837 A | * | 9/1996 | Goodwater et al. .... | 219/121.63 |

(Continued)

FOREIGN PATENT DOCUMENTS

DE   199 57 771 A1   6/2001

(Continued)

OTHER PUBLICATIONS

U.S. Appl. No. 11/560,131, filed Nov. 15, 2006, Mons, et al.

(Continued)

*Primary Examiner*—Christopher Verdier
*Assistant Examiner*—Aaron R Eastman
(74) *Attorney, Agent, or Firm*—Oblon, Spivak, McClelland, Maier & Neistadt, L.L.P.

(57) ABSTRACT

In the method, a support is provided presenting an annular base for a wiper, and the projecting portion of the wiper is built up by depositing successive layers on the base by performing the following steps:

activating both a laser source connected to an optical head focused on a point of the surface of the top of the base and a source of powder that is connected to a spray nozzle, thereby forming a localized melt at said point, with the powder being injected into the melt, thereby forming a localized region of extra thickness; and aiming the optical head and the nozzle on another point adjacent to said region of extra thickness, and returning to the preceding step, until a layer has been formed over substantially the entire base.

7 Claims, 3 Drawing Sheets

U.S. PATENT DOCUMENTS

| | | | |
|---|---|---|---|
| 6,146,476 A * | 11/2000 | Boyer | 148/525 |
| 6,534,745 B1 * | 3/2003 | Lowney | 219/121.84 |
| 6,881,919 B2 * | 4/2005 | Pyritz et al. | 219/76.1 |
| 7,038,162 B2 * | 5/2006 | Baker et al. | 219/121.63 |
| 7,139,633 B2 * | 11/2006 | Mazumder et al. | 700/123 |
| 7,358,457 B2 * | 4/2008 | Peng et al. | 219/121.63 |
| 2002/0065573 A1 * | 5/2002 | Mazumder et al. | 700/121 |
| 2002/0170890 A1 * | 11/2002 | Keicher et al. | 219/121.64 |
| 2005/0029235 A1 * | 2/2005 | Mielke | 219/121.64 |
| 2005/0056628 A1 * | 3/2005 | Hu | 219/121.84 |
| 2005/0120941 A1 * | 6/2005 | Hu et al. | 117/1 |
| 2005/0133527 A1 * | 6/2005 | Dullea et al. | 222/1 |
| 2006/0054079 A1 * | 3/2006 | Withey et al. | 117/108 |
| 2007/0193981 A1 * | 8/2007 | Peng et al. | 219/121.33 |

FOREIGN PATENT DOCUMENTS

WO    WO 2005/053860 A2    6/2005

OTHER PUBLICATIONS

U.S. Appl. No. 11/560,172, filed Nov. 15, 2006, Mons, et al.
U.S. Appl. No. 11/560,100, filed Nov. 15, 2006, Mons, et al.

* cited by examiner

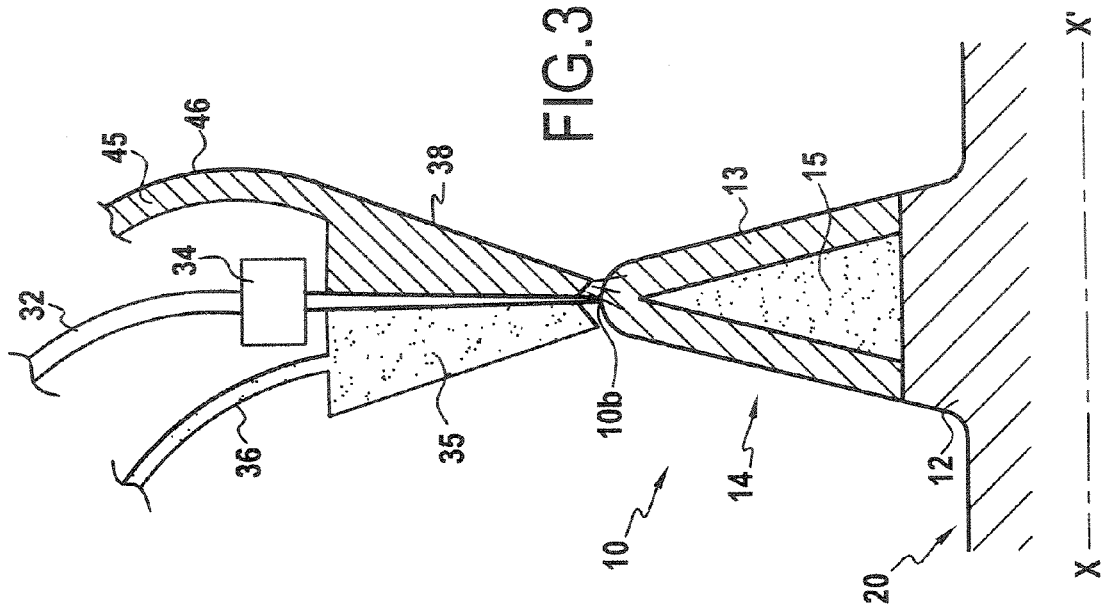
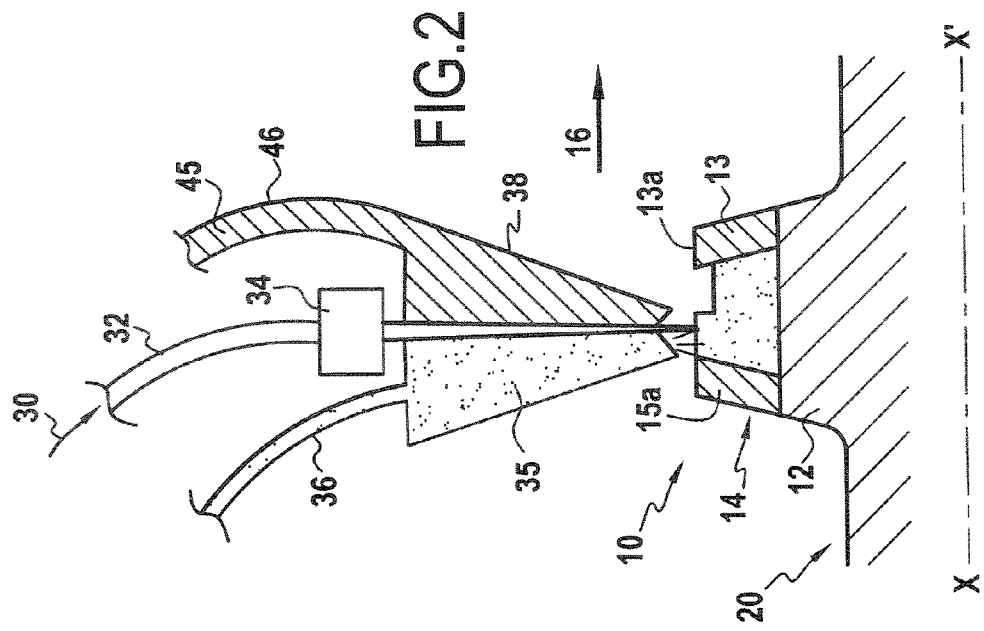

METHOD OF MAKING A WIPER FOR A SEALING LABYRINTH, AND A THERMOMECHANICAL PART AND A TURBOMACHINE INCLUDING SUCH A WIPER

The invention relates to a method of making an annular wiper on a thermomechanical support, in particular for a sealing labyrinth wiper, and it also relates to a thermomechanical part including such an annular wiper, and to a turbomachine including such a thermomechanical part.

BACKGROUND OF THE INVENTION

A sealing labyrinth, also known as a labyrinth seal, comprises a rotary portion having fins (or wipers) and a static bore covered in a soft abradable material or in a honeycomb structure capable of withstanding high temperatures. When the engine starts, the fins rub lightly against the lining, biting into it, thus leading to minimum spacing. This clearance varies over various cycles in flight, depending on the expansion of the part and on the natural flexibility of the moving portions.

The wipers of labyrinths serve to provide aerodynamic sealing between enclosures containing air at different pressures. They are generally situated on the rotor portion facing stator portions. They are mainly constituted by continuous or segmented "blades" of annular shape, capable of being directed radially inwards or outwards.

In particular, when they are continuous in shape, wipers are liable to come into contact with the stator in certain operating configurations. In order to avoid them being destroyed in such situations, stators are fitted with coatings that provide the interface and that are referred to as being "abradable". Under such circumstances, the usual sequences for wiper penetration into the abradable layer consist in a radial cut associated with an axial displacement ("straight turning").

In reality, the usual abradable materials can turn out to be relatively abrasive, in particular against certain continuous wipers, particularly if they are made of titanium-based alloy, but also if they are made of steel or of nickel-based alloy. This is particularly true when the abradable linings are made in the form of honeycombs of refractory alloy.

In order to avoid wipers being damaged, or even destroyed, they are commonly coated by thermally spraying (plasma torch, high velocity oxyfuel (HVOF), . . . ) an abrasive deposit of the alumina and titanium dioxide or carbide type, e.g. on an underlayer of aluminum and nickel alloy in order to provide bonding.

Deposition by thermal spraying requires relative spray angles to be complied with between the axis of the torch and the surfaces of the parts to be coated, so that the sprayed particles impact as close as possible to orthogonally on the surface for coating in order to obtain a deposit of satisfactory quality and with satisfactory bonding. That technique also requires a minimum distance between the spraying tool and the surface: the hot central zone of the flame from the torch can be at several thousands of degrees centigrade, so it must be kept far enough away from the part; in addition, the particles to be deposited must be accelerated sufficiently to adhere on the surfaces that are to be protected.

Furthermore, the propellant or plasma-generating gases used for spraying purposes must be easy to exhaust while ensuring that the sprayed powder is not "blown about" by creating turbulence.

In general, the wipers are oriented practically orthogonally to the cylindrical surfaces of the rotors, and they are often situated close to disk or labyrinth sheets at the bottoms of cavities or close to other wipers when they are placed in series.

Amongst these situations, numerous circumstances arise that present a geometrical arrangement that makes deposition by thermal spraying very uncertain or practically impossible.

As a result, the abrasive coating is deposited preferentially only on the end (tip) of the wiper and as a result its flanks are poorly protected, which can lead to the wiper becoming worn more quickly.

OBJECTS AND SUMMARY OF THE INVENTION

An object of the present invention is to overcome that drawback by proposing a solution that makes it possible to avoid making a deposit by thermal spraying while nevertheless being able to make wipers that are not damaged by coming into contact with the abradable ring.

This object of the invention is achieved by the method of making an annular wiper on a thermomechanical support, in particular for a sealing labyrinth, which method comprises the following steps:

a) a support is provided that is circularly symmetrical about a longitudinal axis and that presents a base for an annular wiper;

b) at least one source of powder material and a spray nozzle connected to said source are provided that are suitable for moving relative to the support;

c) a laser source is provided connected to an optical head suitable for moving relative to the support in order to focus the laser beam on a point on the surface of the support;

d) the optical head and the nozzle are aimed at a common point of the surface of the top of the wiper base;

e) the laser source and the source of powder material are activated, thereby forming a localized melt in the vicinity of said point, and into which the powder material is injected, thereby forming a localized region of extra thickness;

f) the optical head and the nozzle are aimed at another point of the surface of the top of the base adjacent to said localized region of extra thickness, and the method returns to step e) until a layer has been formed over substantially the entire width of the top of the base; and g) at least a fraction of the projecting portion of the wiper is built by depositing successive layers that become narrower in the longitudinal direction on the top of the base, each layer resulting from performing steps d) to f).

It will be understood from the above that instead of using thermal spraying to deposit an abrasive coating on the surface of a wiper, the invention proposes building up the wiper in full, or over at least a fraction of the height of the projecting portion or tip of said wiper, and to do so by using laser spraying.

Laser spraying consists in using a laser beam that can be aimed very accurately to create a highly localized melt on the part, and in injecting into said melt a powder (made of metal and/or ceramic) that can be abrasive. Thus, unlike thermal spraying, there is no need to heat the powder, and its path can thus be separate from that of the laser beam.

The laser beam propagates from its source to the target over an optical path. The optical path is built up either by a succession of mirrors that receive the beam and that reflect it in a different direction, together with lenses that cause the beam to converge or diverge or remain parallel, or else the path is provided by an optical fiber.

Either way, the optical path is terminated by a system of lenses referred to as an "optical head" causing the beam to converge on a point at a certain distance away therefrom. Zones of the part that were difficult to access with the torch devices used to perform thermal spraying can now be reached by a laser spray device providing there is no obstacle between the optical head and the point of impact for the beam on the part. With thermal spraying, it is necessary for the powder to arrive so that it impacts in a direction normal to the surface that is to be coated. With the method proposed in the present invention, in completely different manner, laser spraying only requires a melt to be filled, and the powder can be delivered over a wide variety of trajectories relative to the surface receiving the powder.

The metal powder is delivered by a powder dispenser. It travels along a tube having an end fitted with a nozzle that directs the powder towards the melt created by the laser beam. The tube may be flexible and guided by a rigid support arm or by a robot or by any other positioning device, or it may itself be rigid and pointed towards the zone of the part that is to be coated.

Other differences can be identified between the thermal spraying method and the laser spraying method.

With thermal spraying, the nozzle transmitting the hot gas must be close to the surface that is to be coated, whereas with laser spraying, the optical head can be relatively distant from said surface. With thermal spraying, the powder must be heated since it must follow the same trajectory as the hot gas, but this does not apply to laser spraying in which the trajectory of the powder can be separate from that of the laser beam.

In addition, with thermal spraying, a continuous coating method is provided, whereas with laser spraying, given the flexibility with which a laser beam can be controlled, it is possible to perform spraying either continuously or sequentially, merely by switching the laser beam on and off.

Furthermore, it will be understood that the solution in accordance with the present invention avoids any need to machine the tip of the wiper, where said tip is in a location that is relatively difficult for it to be machined. By means of the method of the present invention, the tip of the wiper is built up layer by layer, simultaneously with a coating of a material that is sufficiently abrasive.

In this respect, it should be observed that the method can be used for building up the wiper over its full height (in which case the annular wiper base is merely an annular segment of the outside surface of the support, e.g. the rotor), or else the method can be used solely for building up the wiper over that portion of its height that forms its end or its tip (in which case the annular wiper base presents an annular volume extending over a certain height and obtained by prior machining).

In step e), the laser source and the source of powder material are activated successively or almost simultaneously so that the localized melt is present at the location where the laser beam is directed when the powder reaching that location impacts against said surface.

Preferably, steps d) to f) are performed until the entire surface of the top of the base has been coated in a layer, and during step g) the projecting portion of the wiper is built up by successively depositing layers that are narrower and narrower in the longitudinal direction over the entire surface of the top of the base, each layer resulting from performing steps d) to f).

It is preferable to build up the wiper stratum by stratum beginning by making a new layer over the entire surface of the top of the wiper before continuing to build the wiper radially further out.

Nevertheless, other methods of building up the wiper could be devised, including building one annular sector layer by layer before continuing with building another annular sector, or indeed by using a plurality of optical heads and a plurality of nozzles, thereby simultaneously building up a plurality of angular sectors of the wiper.

Preferably, during step f), the surface of the top of the base of the wiper is followed in a longitudinal direction prior to changing angular sector.

Under such circumstances, each layer is built up line by line by moving the aiming point of the optical head and the nozzle along said line (or by moving the support relative to the laser spraying equipment) parallel to the longitudinal direction parallel to the axis of revolution, prior to shifting through an angular offset and beginning on a new line, until an entire layer has been made.

Naturally, it is possible to devise other travel trajectories for building each layer, for example by making annular beads one after another, the beads being offset slightly in the longitudinal direction relative to one another.

According to another preferred disposition, during step f), the laser source and the sources of powder material remain activated.

In this way, it is possible to build up the wiper continuously by forming successive islands of material, either by forming the wiper completely, or by using sequences each corresponding to making a portion only (e.g. one complete layer of the wiper). Alternatively, or in combination with these various options, it is also possible, in particular in zones that are the most difficult to reach and/or the smallest in terms of dimensions, to deposit material point by point with the laser source and the source of material being deactivated during step f).

The invention also provides a thermomechanical part including at least one annular wiper for a sealing labyrinth, wherein said wiper is obtained by the method according to any preceding claim, the thermomechanical part forming said support.

As can be seen from the above description of the method in accordance with the invention, it must be understood that the wiper is formed by said method either entirely (over its full height), or in part only, i.e. only its annular end portion constituting its top.

Under such circumstances, the radially-inner portion of the wiper is formed by a base previously machined directly in the support.

In particular, the thermomechanical part constitutes the rotor of a turbomachine.

The present invention also provides a turbomachine including a thermomechanical part of the above-specified type.

BRIEF DESCRIPTION OF THE DRAWINGS

The invention can be well understood and its advantages appear better on reading the following detailed description of an embodiment of the invention given by way of non-limiting example.

The description refers to the accompanying drawings, in which:

FIGS. 2 and 3 are fragmentary diagrammatic axial section views on a larger scale of a circularly symmetrical thermomechanical part showing how the cross-section and the profile of the wiper vary while implementing the method in accordance with the present invention.

MORE DETAILED DESCRIPTION

Since the present invention relates to sealing wipers for a circularly symmetrical thermomechanical part of a turbojet, in particular for a rotor, the description below relates to one possible and non-limiting application of a wiper of this shape in accordance with the present invention.

Figure 1:
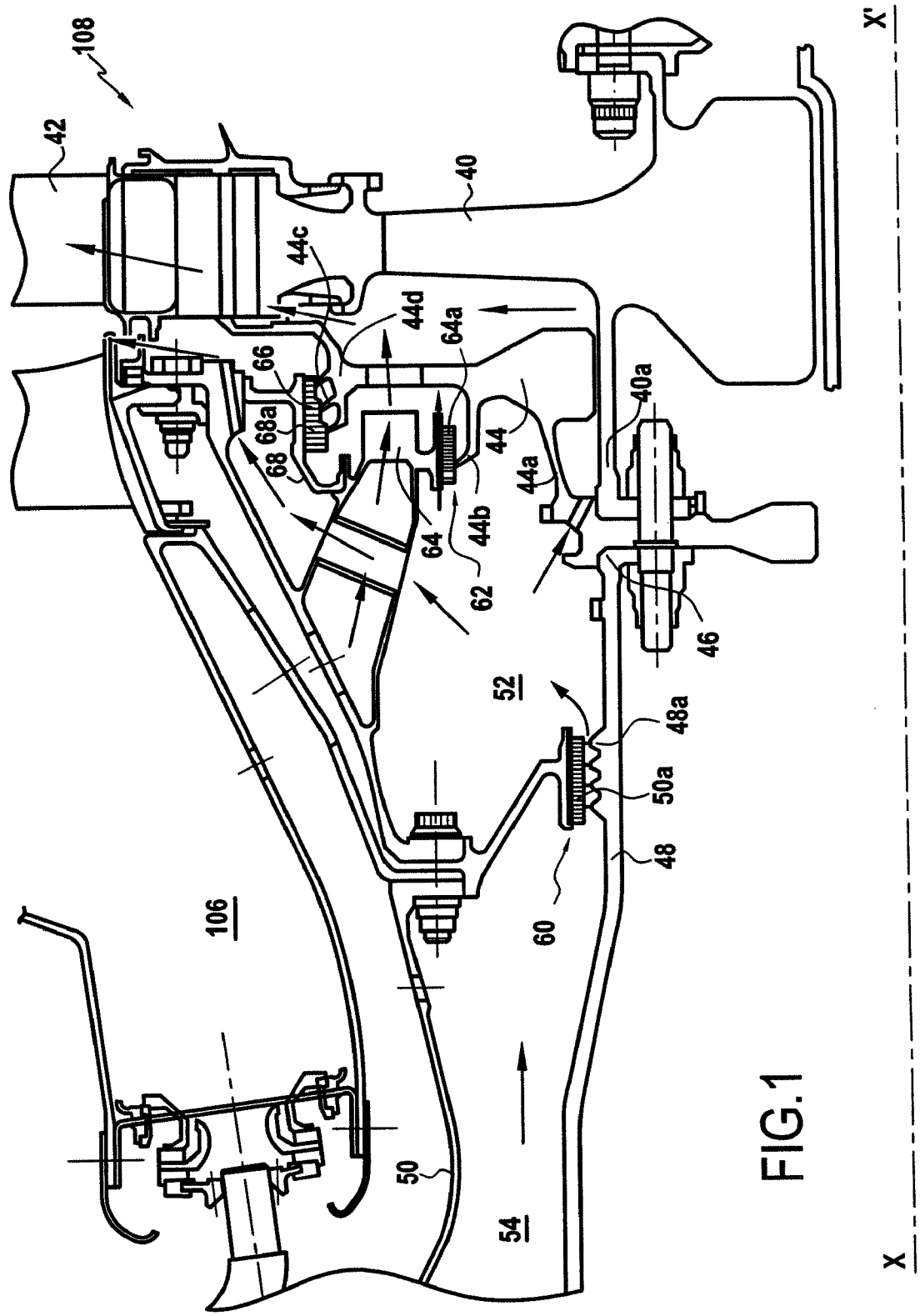
FIG. 1 is an axial half-section of a turbojet turbine rotor showing the disposition of the end plate and the sealing labyrinths upstream from main injectors.

FIG. 1 shows a circumstance in which the wipers are used in sealing labyrinths and are disposed facing abradable elements. It relates to a ventilation circuit for a high pressure turbine disposed downstream from a combustion chamber 106.

In particular, there is a turbine 108 having its circularly symmetrical rotor movable in rotation about an axis X-X'.

The rotor of the turbine 108 comprises a turbine disk 40 fitted with blades 42, and an end plate 44 disposed upstream from the disk 40. Both the disk 40 and the end plate 44 have a respective upstream flange referenced 40a for the disk 40 and 44a for the end plate 44, enabling them to be secured to the downstream end 46 of the downstream cone 48 of the high pressure compressor driven by the rotor of the turbine 108.

This arrangement of the cooling circuit has three successive discharge labyrinths.

A first discharge labyrinth 60 is formed upstream from the enclosure 52 separating the end plate 44 from the end of the chamber, and downstream from the enclosure 54 separating the downstream cone 48 of the high pressure compressor from the inner casing 50 of the combustion chamber 106. This first discharge labyrinth 60 comprises wipers 48a formed on the downstream cone 48 and a ring 50a of abradable material mounted at the end of a plate secured to the inner casing 50.

A second discharge labyrinth 62 is situated under injectors 64, downstream from the enclosure 52. This second discharge labyrinth 62 is made up of wipers 44b of the end plate 44 and a ring of abradable material 64a mounted on the injectors 64.

The third discharge labyrinth 66 is situated above the injectors 64 and comprises three successive wipers 44c formed on an angled portion 44d of the end plate 44, and an abradable sealing ring 68a mounted on the inner casing 68.

According to the invention, all or some of the various wipers 48a, 44b, and 44c are not coated by thermal spraying, but are built of by laser spraying.

In FIG. 1, the present invention is shown in application with a high pressure turbine. Nevertheless, it should be understood that the present invention can be implemented in other zones of a turbomachine, in particular in a high pressure compressor, in a low pressure compressor, or in a low pressure turbine.

Likewise, in FIG. 1, the wipers are disposed on a moving rotor with all of them being directed radially outwards. Nevertheless, it will readily be understood that the present invention can apply equally to wipers that are directed radially inwards towards the axis of rotation.

By way of example, an embodiment in accordance with the present invention is described below with reference to FIGS. 2 to 4.

Figure 4:
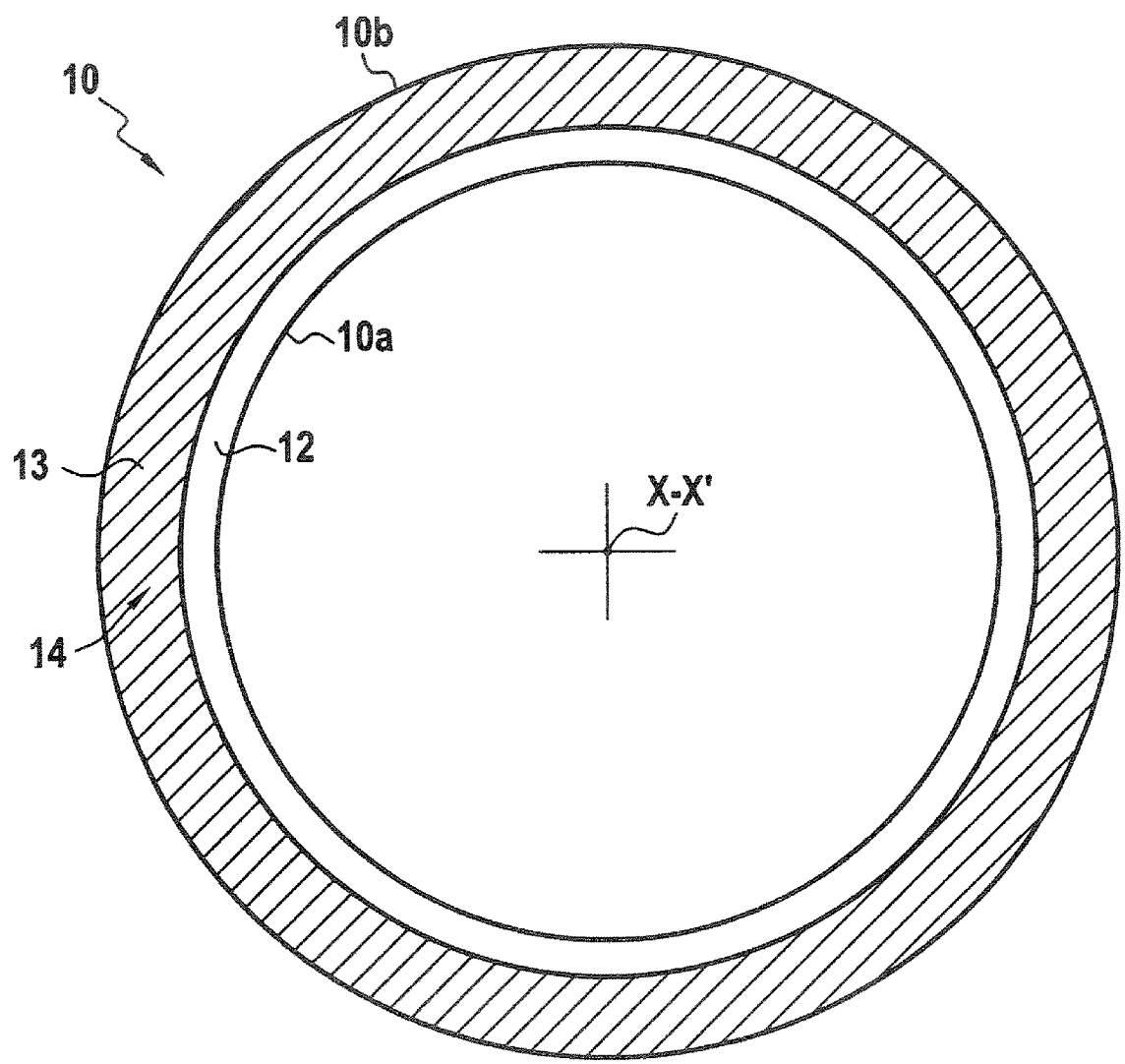
FIG. 4 is a cross-section view of the circularly symmetrical thermomechanical part showing the flank of the wiper after it has been made in accordance with the invention.

FIG. 4 shows the axis of rotation X-X' about which a wiper 10 extends radially, presenting an inner outline 10a that is circular about the axis X-X' and an outer outline 10b that is circular about the axis X-X'.

In longitudinal section relative to the axis X-X', the outer profile of the wiper 10 presents, as can be seen in FIG. 3, a shape that is substantially in the form of an upside-down letter V or an upside-down letter U with the limbs of the U-shape sloping towards the top of the wiper defined by the outer outline 10b.

This description thus corresponds to the same annular shape as a prior art wiper, i.e. a wiper presenting height that is constant around its circumference, with a profile that is substantially in the form of an upside-down U-shape or V-shape.

Nevertheless, as explained above, in the prior art, the wiper is machined directly in the support in order to obtain the above-outlined shape, and then the wiper is coated in a deposit obtained by thermal spraying in order to reinforce its abrasion-resistance properties.

In contrast, in the present invention, the support 20 is machined solely to provide a base 12 that projects from the top surface of the support 20 by no more than a few millimeters in order to initiate the beginning of the shape for the wiper 10.

Thereafter, to make the remainder of the wiper 10, i.e. its end or tip 14, equipment is used that is suitable for performing laser spraying (not shown in full).

This equipment comprises the following portions:

a system enabling the support 20 to be held and moved, in particular in rotation and in translation;

a laser ($CO_2$ or YAG) source 30 having a system for transmitting a laser beam 32 by reflection on mirrors or by using an optical fiber so as to reach an optical head 34;

the optical head 34 presents a focal length that corresponds to the distance between the head and the surface to be coated, said optical head 34 being secured to a positioning apparatus capable of placing it in such a manner that the focus of the beam can scan all of the points of a straight section of the surface to be coated, or of the volume to be built; and at least one source of a first powder material 35 comprising a powder-metering dispenser as well as a feed tube 36 for feeding the powder to a nozzle 38.

In the example shown, a source of a second powder material is also provided that is connected to the nozzle 38 by a corresponding feed pipe 46.

It will thus be understood that it is preferable to supply both a first powder material source and a second powder material source for providing first and second powders 35 and 45, said first source and said second source both being connected to the spray nozzle 38.

In the circumstances shown diagrammatically in FIGS. 2 and 3, the optical head 34 and the nozzle 38 form a single assembly, i.e. the optical head 34 and the spray nozzle 38 are secured to each other in a common spray assembly of position that is adjustable relative to the support 20.

Nevertheless, the nozzle 38 could equally well be situated separately beside the laser beam, being supported by positioning apparatus specific thereto in order to enable it to follow the movements of the focus point of the laser beam.

With reference to FIG. 2, it should be understood that the tip 14 of the wiper 10 is built up layer by layer as far as the free end of the tip 14 defining the outer outline 10b.

For each layer, and preferably, the second powder material 14 is initially melted to form two annular beads 13a along two longitudinal edges of the top of the base 12 (or of the previously-made layer), and then the first powder material 35 is supplied to the localized melt generated by the laser beam so as to fill the space in the form of a depression that extends between the two annular beads, thereby enabling a zone 15a to be built that is to constitute the final core 15.

In this manner, the two annular beads 13a forming a coating 13 and the zones 15a forming the core 15 of the wiper 10 are built up layer by layer, the last layer being formed merely by juxtaposing two annular beads 13a of the second powder material 45.

Preferably, it is ensured that the first powder material 35 is identical to the material constituting the support, while the second powder material 45 is harder than the first material.

In this way, a coating 13 is obtained that is harder than the core 15.

It will thus be understood that, preferably, each layer is the result of performing the following two sub-steps:

forming on the surface of the base of the wiper 10 two annular beads 13a with the second powder material 45 because, during the preceding step, the optical head 34 and the nozzle 38 are moved angularly a little over the circumference relative to the previously-obtained localized region of extra thickness; and filling the zone 15a situated between the two annular beads 13a with the first powder material 35.

Each annular bead 13a is thus made by continuously making the deposit by laser spraying while turning the support 20 about the longitudinal axis X-X', and without moving the support 20 longitudinally.

The depression defined between the two beads 13a can be filled with the first material 35 in various different ways, including the following:

either by an angular offset building up an annular bead little by little parallel to the beads 13a formed of the second material 45, and then performing a longitudinal offset on each new revolution so as to form a new annular bead;

or else by performing a longitudinal offset (arrow 16 in FIG. 2) in order to fill the zone 15a in a longitudinal direction between two beads 13a and by performing an angular offset before forming a new longitudinal line in the opposite direction in order to fill the space between the two beads 13a by forming successive angular sectors.

FIG. 2 shows the result of making a plurality of annular layers to form a portion of the tip 14 of the wiper 10, while FIG. 3 shows the last step of building the wiper during which the final layer is sufficiently narrow for the two annular beads 13a to meet.

Thus, in FIG. 3, the annular wiper 10 is formed by a base 12 surmounted by a tip 14 that is constituted by a core 15 made of the same material as the support 20, and by a coating 13 covering the entire core 15 and made of a material that is different from that of the core 15.

It should be observed that the present invention also covers the circumstances in which none of the base 12 is machined beforehand in the support 20, with the entire height of the wiper 10 being made by being built up in the manner described above, the base 12 then being constituted merely by an annular segment of the outside surface of the support 20 (not shown).

Likewise, using the same equipment as that described with reference to the figures, it is possible to envisage building up the tip 14 of the wiper 10 by progressively modifying the composition of the material from the outside surface forming the coating 13 towards the core 15 of the wiper 10 by causing the proportions between the first and second powder materials 35 and 45 to vary progressively.

The first source and the second source of powder materials 35 and 45 can be activated simultaneously so that the nozzle 38 sprays a mixture of the two powder materials, while taking care to adapt the proportions so that the coating 13 is richer in the second powder material 45 in order to make a coating 13 that is harder that the core 15.

Under such circumstances (not shown), the annular wiper 10 is formed by a base 12 surmounted by a tip 14 of composition that varies progressively between its core 15 and its surface 13.

Furthermore, the present invention also covers circumstances in which only one source of powder material is used for making the entire tip 14 of the wiper 10.

It will be understood that the method proposed in the present invention serves firstly to avoid performing difficult machining, and secondly, when using two different materials for the core and the surface, to provide a coating in certain geometrical configurations that could not be implemented properly by a thermal spraying method.

Amongst the materials that can be used, it is preferable for the core 15 to be made of a metallic powder material having the same composition as the support 20, i.e. a titanium alloy or a nickel-based alloy, while for the coating 13, it is preferable to use materials that are hard and abrasive. In particular, for the coating 13, a selection should be made amongst metals that withstand oxidation when hot such as an alloy of the MCrAlY type (where M is a metal selected from nickel, cobalt, iron, and mixtures thereof), or an alloy based on cobalt, chromium, and tungsten, such as Stellite (registered trademark). It is also possible to use ceramics such as titanium dioxide ($TiO_2$), alumina ($AlO_2$), zirconia ($ZrO_2$), or a mixture based on at least one of them.

In addition, in the drawings, a wiper is shown that is directed radially outwards, however provision could be made to apply the present invention equally well to a wiper that is directed radially inwards.

What is claimed is:

1. A method of making an annular wiper on a thermomechanical support for a sealing labyrinth, the method comprising:

a) providing a support that is circularly symmetrical about a longitudinal axis and that presents an annular base for a wiper;

b) providing a spray nozzle which moves relative to the support and a first source of a first powder material identical to the material of the support, and a second source of the second powder material that is harder than the first material, said first source and said second source being connected to the spray nozzle;

c) providing a laser source connected to an optical head which moves relative to the support to focus the laser beam on a point of the surface of the support;

d) aiming the optical head and the nozzle at a common point of the surface of the top of the base of the wiper;

e) activating the laser source and the sources of powder material so as to form a localized melt at said point, into which the powder material is injected, thereby forming a localized region of extra thickness;

f) aiming the optical head and the nozzle on another point of the surface of the top of the base adjacent to said localized region of extra thickness and returning to step e) until a layer has been formed over substantially the entire width of the top of the base; and g) building at least a fraction of the projecting portion of the wiper by successively depositing layers that become narrower and narrower in the longitudinal direction on the top of the base, each layer being the result of performing steps d) to f), and comprising, at its both edges, an annular bead belonging to the coating of the tip of the wiper and constituted in the majority with the second material, and a zone filling a space circumscribed between the two annular beads and belonging to the core of the tip of the wiper, said zone being constituted in majority with the first material.

2. A method according to claim 1, wherein steps d) to f) are performed until the entire surface of the top of the base has been coated in a layer, and wherein, during step g), the projecting portion of the wiper is built up by successively depositing layers that are narrower and narrower in the longitudinal direction over the entire surface of the top of the base, each layer resulting from performing steps d) to f).

3. A method according to claim 1, wherein, during step f), the surface of the top of the base of the wiper is followed in a longitudinal direction prior to changing angular sector.

4. A method according to claim 1, wherein, during step f), the laser source and the sources of powder material remain activated.

5. A method according to claim 1, wherein, during step g), each layer results from the following sub-steps:
- g1) forming two annular beads on the surface of the base of the wiper using the second powder material by moving the optical head and the nozzle during step f) angularly over the circumference relative to the previously-obtained localized region of extra thickness; and
- g2) filling a zone situated between the two annular beads with the first powder material.

6. A method according to claim 1, wherein, during step e), both the first source and the second source of powder material are activated simultaneously so that the nozzle projects a mixture of powder materials, the proportion between the first and second powder materials varying so as to build the tip of the wiper by gradually modifying the composition between the coating with a higher second material content, and the core.

7. A method according to claim 1, wherein the optical head and the spray nozzle are secured to each other in a common projection assembly of position that can be adjusted relative to the support.

* * * * *